July 9, 1929.  J. C. HAGGART, JR  1,719,884
SPRING CONNECTION
Filed May 19, 1924   2 Sheets-Sheet 1
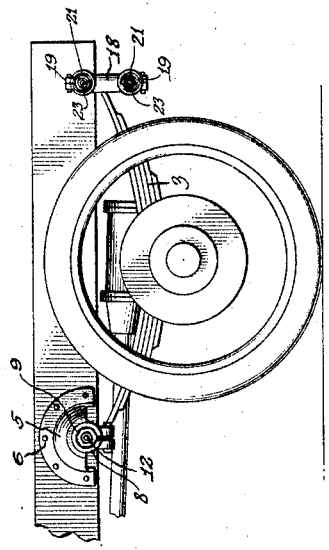
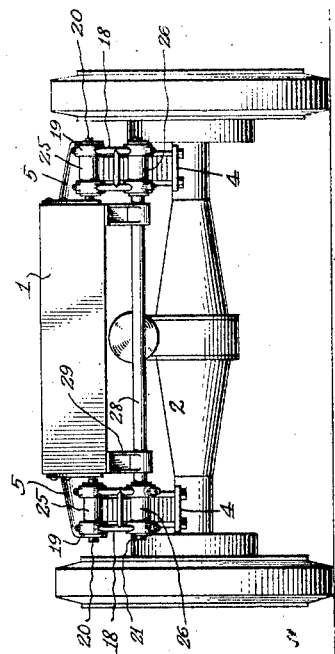
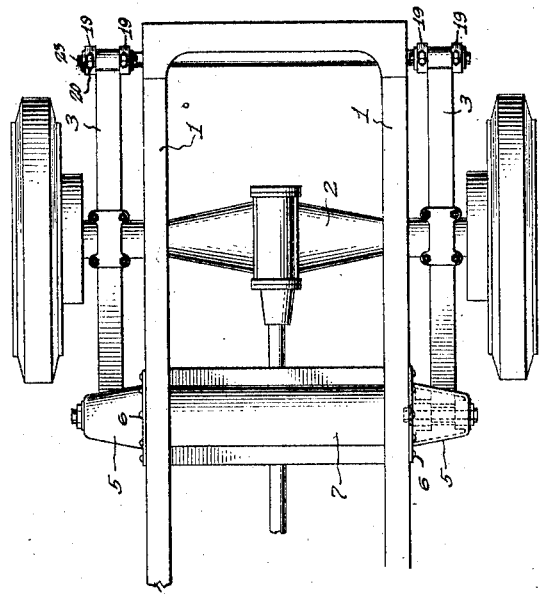
Inventor
John C. Haggart Jr.
By
Attorneys July 9, 1929.  J. C. HAGGART, JR  1,719,884
SPRING CONNECTION
Filed May 19, 1924  2 Sheets-Sheet 2
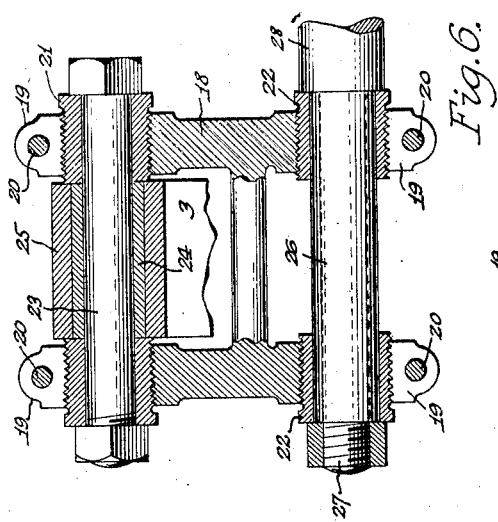
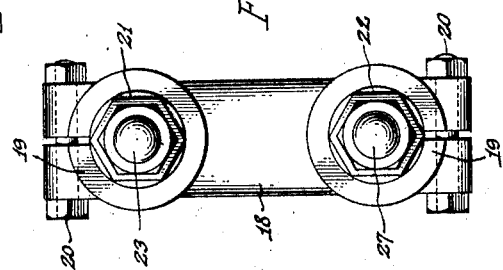
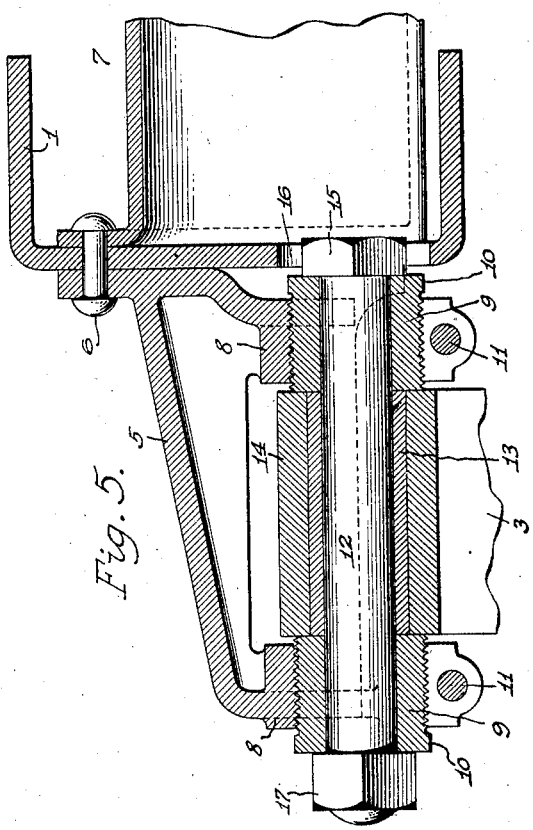
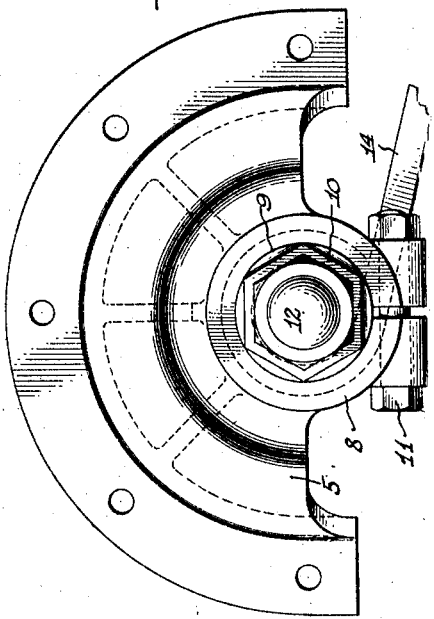
Inventor
John C. Haggart Jr.
By
Attorney Patented July 9, 1929.

1,719,884

UNITED STATES PATENT OFFICE.

JOHN C. HAGGART, JR., OF ALMA, MICHIGAN, ASSIGNOR, BY MESNE ASSIGNMENTS, TO DETROIT PATENTS HOLDING COMPANY, OF DETROIT, MICHIGAN, A CORPORATION OF MICHIGAN.

SPRING CONNECTION.

Application filed May 19, 1924. Serial No. 714,249.

In my Patent No. 1,578,026 of March 24, 1926, there is disclosed a hood shaped spring supporting bracket for a vehicle chassis which includes a novel cross member for bracing the chassis at the spring brackets, and this application is directed to a bracket or shackle connection for the eye end of a spring.

My invention aims to furnish the bearings of a bracket or shackle with adjustable means to prevent sidewise shifting of the end of a spring on a bracket or shackle bolt, thus eliminating side slipping of a spring in a bracket or shackle and the noise incident to such a loose connection. The adjustable means, besides eliminating noise, permits of the eye end of a spring being correctly positioned relative to a bracket or shackle body, and all of this is accomplished by a simple, durable and inexpensive construction that will be hereinafter specifically described and then claimed.

Reference will now be had to the drawings wherein

Figure 1 is a plan of a portion of the vehicle chassis provided with brackets and shackles in accordance with my invention;

Fig. 2 is a side elevation of the same;

Fig. 3 is a rear elevation of the chassis showing the shackles;

Fig. 4 is an enlarged side elevation of a spring bracket;

Fig. 5 is a longitudinal sectional view of the same;

Fig. 6 is a similar view of a spring shackle, and

Fig. 7 is a side elevation of the same.

In the drawing, the reference numerals 1 denote the channel side frames of a vehicle chassis and the rear end of said chassis is adaped to be supported from the rear axle assembly 2 by laminated springs 3 mounted on perches 4 of the rear axle assembly. The front ends of the springs 3 are adapted to be mounted in hood-shaped brackets 5 attached to the outer sides of the frames 1 by rivets 6 or other fastening means, said rivets 6 also holding the ends of a semi-cylindrical flanged cross member 7 in engagement with the chassis frames.

Each of the brackets 5 include split interiorly screw-threaded bearings 8 and adjustable in said bearings are bushings 9 having outer nut ends 10. After the bushings 9 have been properly adjusted in the bearings 8 the clamping bolts 11 of said bearings are tightened to hold the bushings fixed. The bushings accommodate a bolt 12 which extends through a bushing or sleeve 13 in the eye or barrel 14 at the forward end of each spring 3, and the bushings 9 are adapted to be adjusted to have the inner ends thereof engage the ends of the eye or barrel 14 and the bushing or sleeve 13 mounted therein. Such bushing engagement will properly center the end of the spring relative to the bearings 8, prevent sidewise shifting of the spring in the bracket, and eliminate noise incident to such an ordinary loose connection.

The bolt 12 may have its head 15 extend into an opening 16 provided therefor in a side frame 1 and the nut 17 on said bolt may be held by a conventional form of lock washer. The bolt may also be turned for lubricating purposes, and it is obvious that from time to time adjustments may be made in connection with the bushings and bolt to compensate for wear.

The rear end of each spring is adapted to be held by an H-shaped shackle 18 having split interiorly screwthreaded bearings 19 provided with clamping bolts 20. Screwed into the bearings 19 and adapted to be fixed therein by the clamping action of said bearings are bushings 21 and 22 similar to the bushings 9. In the bushings 21 is a nut equipped bolt 23 provided with a bushing 24 for the eye or barrel end 25 of a spring 3 and the ends of the bushings 24 and the eye or barrel 25 are adapted to be engaged by the inner ends of the bushings 21.

In the bushings 22 is a sleeve 26 for the nut equipped spindle 27 of the transverse rod 28 mounted in hangers 29 carried by the rear end of the chassis.

From the foregoing it will be observed that the adjustable bushings can be used in connection with spring brackets or shackles and while in the drawing there is illustrated a preferred embodiment of my invention, it is to be understood that the structural elements are susceptible to such variations and modifications as fall within the scope of the appended claim.

What I claim is:—

The combination of a vehicle frame having an opening, a bracket secured to the outer wall of said frame above the opening thereof, interiorly screwthreaded split bearings forming part of said bracket and provided with clamping bolts, one of said bearings being set in said bracket and spaced from said frame, bushings screwed in said bearings and clamped therein by the bolts of said bearings, one of said bushings projecting into the space between said bracket and frame and adapted to be adjusted by a tool placed in said space, a bolt connecting said bushings and extending into the frame opening, and an adjusting member on said bolt and engaging the bushing in said space, whereby said member may be reached by a tool placed in said opening.

In testimony whereof I affix my signature.

JOHN C. HAGGART, Jr.